United States Patent [19]

Elmer

[11] 4,011,914
[45] Mar. 15, 1977

[54] FIELD MARKING SYSTEM

[76] Inventor: Willard Owen Elmer, P.O. Drawer C, Indianola, Nebr. 69034

[22] Filed: Nov. 22, 1974

[21] Appl. No.: 526,147

[52] U.S. Cl. ............................ 172/126; 239/168
[51] Int. Cl.² ................. B05B 1/20; A01B 49/06
[58] Field of Search .......... 172/126, 127, 128, 129, 172/130, 131, 132, 311, 392, 393; 239/159, 160, 161, 162, 166, 167, 163, 164, 165, 168; 56/14.9, 15.2, 15.7; 111/33; 280/34 R, 150.5, 411 R, 473

[56] References Cited

UNITED STATES PATENTS

| | | | |
|---|---|---|---|
| 1,080,425 | 12/1913 | Davis | 172/132 |
| 2,613,586 | 10/1952 | Boenig | 172/126 |
| 2,725,256 | 11/1955 | Devost et al. | 239/167 |
| 2,793,909 | 5/1957 | Gerbracht | 239/167 X |
| 3,107,055 | 10/1963 | Palmer | 239/167 X |
| 3,158,204 | 11/1964 | Martin | 172/126 |
| 3,339,843 | 9/1967 | Horton | 239/159 X |
| 3,351,287 | 11/1967 | Funk et al. | 239/162 X |
| 3,447,750 | 6/1969 | Weston | 239/167 |
| 3,503,451 | 3/1970 | Eastman | 172/132 |
| 3,511,316 | 5/1970 | Oerman et al. | 172/126 |
| 3,524,508 | 8/1970 | West | 172/126 |
| 3,828,860 | 8/1974 | Poland | 172/311 |
| 3,887,132 | 6/1975 | Widmer | 239/166 |

FOREIGN PATENTS OR APPLICATIONS

| | | | |
|---|---|---|---|
| 145,529 | 3/1952 | Australia | 239/168 |
| 886,277 | 1/1962 | United Kingdom | 239/159 |

*Primary Examiner*—Richard T. Stouffer

[57] ABSTRACT

Agricultural apparatus for distributing material, such as fertilizer or pesticide, to a field, characterized by apparatus adapted to be affixed to a conventional vehicle, such as a truck, and including a pivoted boom extending outwardly from each side of the vehicle, a fixed spray tube or the like extending across the rear end of the vehicle, and caster mounted markers carried by each boom at its outer end for marking the edges of a path over which material is delivered by the booms and fixed spray tube. Each boom is mounted for major pivotal movement about an axis extending upwardly and forwardly with respect to the direction of movement of the vehicle, the angle being of the order of 40° to 60°, which permits the booms to swing rearwardly and upwardly when a marker passes over an obstruction, such as a rock. Each boom is also pivoted for minor movement about a second axis disposed perpendicular to the axis of major pivotal movement and a resilient strut limits the movement about the second axis.

2 Claims, 10 Drawing Figures

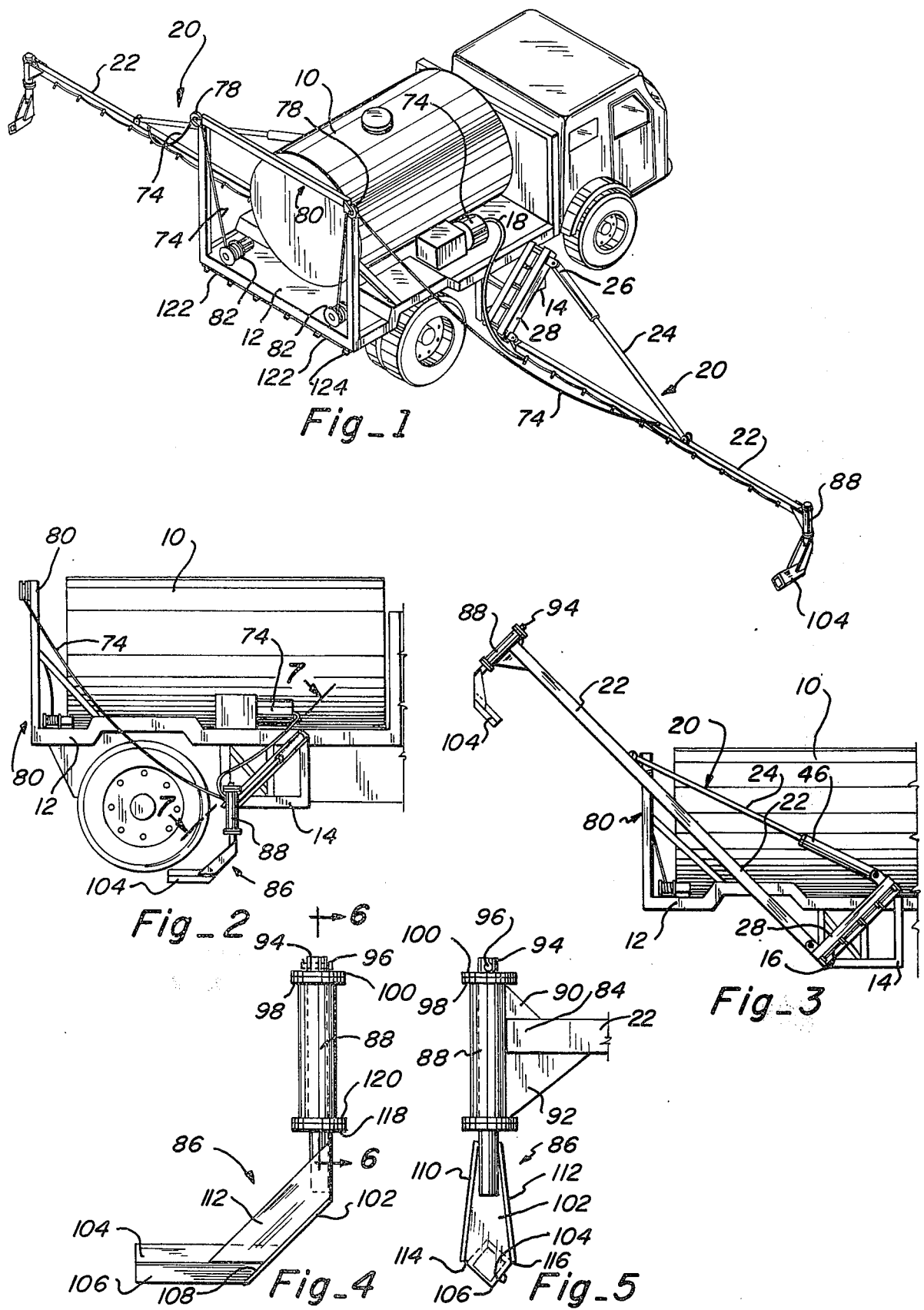

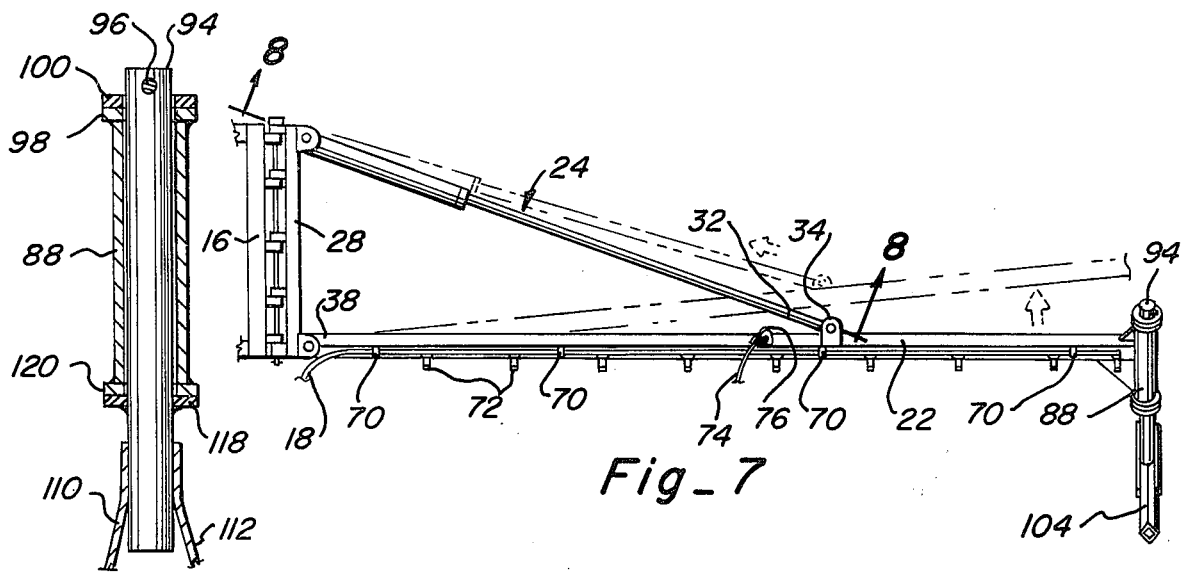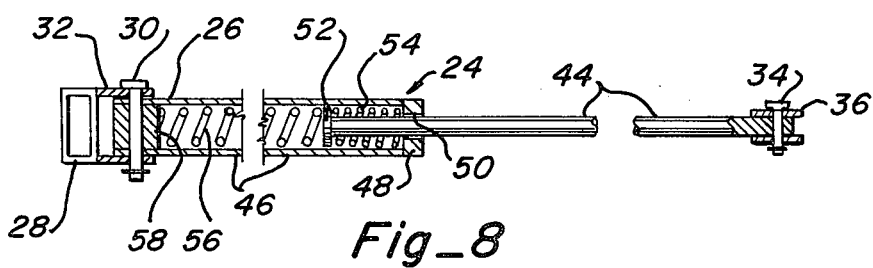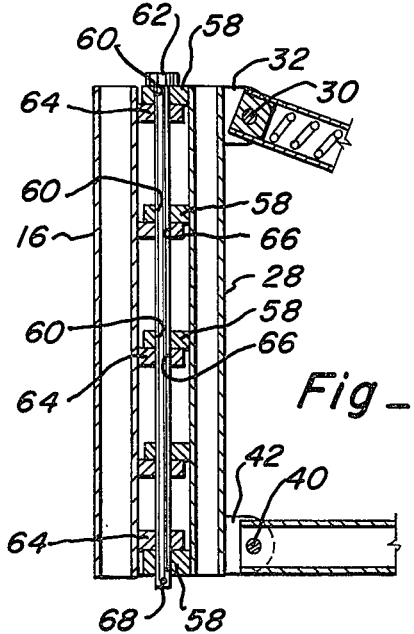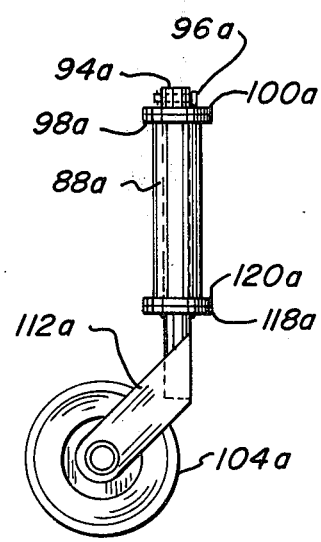

FIELD MARKING SYSTEM

BACKGROUND OF THE INVENTION AND PRIOR ART

With the advent of large scale farming on tracts of land measured in thousands of acres instead of tens of acres, and the development of farm machinery of massive size to handle such acreage, problems arose which were either non-existant or much more simply overcome by the small farm farmer. For example, in making a single pass of a colorless pesticide spray or fertilizer spray, the small farm farmer usually had no difficulty in determining the dividing line between the sprayed portion and the unsprayed portion and could therefore direct his equipment without much difficulty. However, with large scale machinery where a single pass may be as much as from 50 to 75 feet in width, it becomes a very serious problem to determine where to make the next pass. Too much pesticide or fertilizer or too little of either can cause severe damage to a crop, particularly, if the area of either overlap or skipping is of an order of magnitude of ten feet over a distance of 1 or 2 miles. Too much pesticide, i.e., a double dose for such a width can kill from one to three acres of crop through overdose or permit the crop to fail in an equivalent area because of failure to apply any dose whatever.

Prior art methods for combating this problem have included a scribing device such as taught in the U.S. Pat. to Maddox, No. 1,643,625, the patent to Liston, 831,961 and the patent to MacNair, 832,989; a disk-type marker such as taught in U.S. Pat. No. 3,503,451 to Eastman, and a foam marking device such as taught by Cooke, et al in U.S. Pat. No. 3,481,545.

While the scribing devices might have been quite satisfactory for passes up to ten feet in width, beyond that width such marks were difficultly visible, if at all. Other devices encountered difficulty because of the means of mounting devices, and if the apparatus was inadvertently backed up, very often the mount or the support arms were bent or broken.

The present invention contemplates a ground marker which in and of itself is not new (see U.S. Pat. Nos. 2,580,958 and 3,503,451) in combination, however, with a mounting means which enables greater flexibility and accomodation of the apparatus to changes in contour, and preferred embodiments of which also accommodate inadvertent backing up of the truck or apparatus with the distributing arms extended without damage.

BRIEF DESCRIPTION OF THE DRAWINGS

The present invention will be better understood by having reference to the annexed drawings wherein:

FIG. 1 is a perspective view of a farm implement for distributing liquid agricultural chemical, either pesticide or fertilizer, having sled-type marking means at the distal extremities of the outrigger arms and showing saddle means of mounting the apparatus on a vehicle.

FIG. 2 is a fragmentary side elevation of the rear portion of the apparatus shown in FIG. 1 and showing the apparatus in the operative position.

FIG. 3 is a view like FIG. 2 showing the apparatus in the stored or highway travelling position.

FIG. 4 is a side elevation on an enlarged scale of a swivel-type sled marker for the distal extremities of the distributing arms.

FIG. 5 is a rear elevation of the marking device shown in FIG. 4.

FIG. 6 is a cross-sectional fragmentary view of the apparatus shown in FIG. 4 as it appears in the plane indicated by the line 6—6.

FIG. 7 is an oblate view of the apparatus shown in FIG. 2 as it appears in the plane indicated by the line 7—7 in FIG. 2.

FIG. 8 is a broken cross-sectional view on an enlarged scale of one form of telescoping truss rod useful in accordance with the present invention.

FIG. 9 is a fragmentary cross-sectional view on an enlarged scale of a hinged mounting for the laterally extending arm and truss rod enabling it to be moved from an operating position to a stored position.

FIG. 10 is a fragmentary view of the distal extremity of a distributing arm fitted with a wheel-type marker for very wet or extremely soft terrain.

DETAILED DESCRIPTION OF THE DRAWINGS

Referring now more particularly to FIG. 1, there is here shown a truck equipped with a tank 10 containing a liquid agricultural chemical, for example, a fertilizer or pesticide. The tank 10 is supported on a flat bed 12 which is provided with depending framework 14. Depending saddle framework 14 is provided on each side of the flat bed 12 and provides a mount for a hinge support beam 16 mounted at an angle to the ground level, in the preferred embodiment such angle being about 45°. In general, the angle of inclination will range from about 40° to about 60°. The liquid distributing apparatus includes a hose 18 carried on a laterally extensible assembly 20. The assembly 20 includes a laterally extending support arm 22 or boom, a stabilizer brace 24 having a proximal extremity 26 pivotally secured to an inboard member 28 by means of a pivot pin 30 extending through a bracket 32 welded to the member 28 at one end thereof. The distal extremity 32 of the stabilizer brace 24 is pivotally secured by means of a pivot pin 34 (FIG. 8) coacting with a bracket 36 which is conveniently welded directly to the laterally extending support arm 22.

The proximal extremity 38 of the boom 22 is also pivotally anchored by means of a pivot pin 40 coacting with a bracket 42 which is in turn welded or otherwise securely fastened to the cross member 28.

As best shown in FIGS. 7, 8 and 9, the stabilizer brace is desirably, although not essentially, a support link of variable length, and in the preferred embodiment illustrated in the drawings is shown as a telescoping arm 24. As best shown in FIG. 8, the arm 24 includes a rod portion 44 and a sleeve portion 46, the latter being pinned by means of pin 30 at its proximal extremity 26 to the bracket 32 on the cross member 28. The sleeve 46 is provided with an end cap 48 having an opening 50 therethrough suitably sized for sliding acceptance of the proximal extremity of the arm 44. The proximal extremity of the arm 44 is provided with a head 52 larger in cross section than the opening 50 whereby a limit is established for extension of the extensible arm 24. A spring 54 cushions the abutment of the head 52 against the end cap 50. A captive spring 56 in the opposite end of the sleeve 46 also cushions the head 52 against impact with the sleeve 58 in the proximal extremity of sleeve 46. The portions 44 and 46 may be of square cross section instead of circular. Also, instead of an enlarged head 52, the inner telescoping portion 44 may be fitted with a transverse pin adapted to extend through an elongated axially extending slot in the sleeve portion 46. The primary purpose of the telescoping arm 24 is to provide relief in the event the apparatus is inadvertently backed up with the distributing arms extended. In the absence of telescoping means or other means allowing the brace to shorten, it will buckle, and damage may also be done to the proximal end of the distribution arm. Such inadvertent backing up of the truck with the arms extended can occur when ascending an incline and it is necessary to stop or shift gears, and some reverse movement is experienced.

As best shown in FIG. 9, the inboard cross member 28 is provided with a plurality of hinge members 58 each having a bore 60 extending therethrough, the bores 60 being in axial alignment for acceptance of the hinge pin 62. In like manner, the hinge support beam 16 is provided with corresponding hinge members 64 each having a bore 66 extending therethrough, the bores 66 also being in axial alignment and dimensioned to receive the hinge pin 62.

As best shown in FIG. 9 the relative location of the hinge members 58 and 60 is such as to prevent relative axial movement of the hinge members 58 with respect to the hinge member 64. For example, the hinge members 58 at the top and bottom of the cross member 28 are external of the hinge members 64 at the top and bottom of the hinge support beam 16. When the pin 62 is in position, axial movement of the cross member with respect to the hinge support beam 16 is impossible. A cotter 68 is conveniently used to hold the hinge pin 62 in position.

The hose 18 is attached to the support arm 22 by brackets 70 at spaced intervals, and the hose 18 is fitted with spray nozzles 72 at uniform intervals therealong. A pump 74 is provided for forcing fluid from the tank 10 through the hose 18 for distribution through the nozzles 72.

For raising and lowering the assembly 20 by rotation about the axis of the hinge pin 62, there is conveniently provided a cable 74 anchored in an eye lug 76 secured as by welding to the support arm 22 at a point beyond the midpoint in the direction toward the distal extremity thereof. The cable 74 is reeved through a pulley 78 carried on a rear frame 80 and wrapped around a winch 82 mounted on the bed 12. In the operating position as shown in FIG. 1, the cable 74 is generally maintained slack so that the distal extremity of the arm 22 is free to move upwardly and downwardly in response to the contour of land.

As previously indicated, the distal extremity 84 of the support arm 22 is provided with a sled-type ground marker generally indicated by the numeral 86. A sleeve 88 is supported at the distal extremity 84 of the support arm 22 by means of brackets 90 and 92 welded respectively to the sleeve 88 and the arm 22. The location of the sleeve 88 with respect to the arm 22 is such that when the arm 22 is in the operative position as shown in FIG. 1, the sleeve 88 is in a generally vertical attitude as shown in FIG. 2. Sleeve 88 is bored to receive an axle 94 which is held in position by means of a pin 96 extending through the axle 94 as best shown in FIG. 4. The axle 94 is mounted for rotation through 360° in the sleeve 88. Sleeve 88 is provided with an upper flange 98, and the pin 96 rides on a washer 100.

The axle 96 extends through the lower end of the sleeve 88, and may have the lower extremity thereof cut at an angle of 45° to receive a backing plate 102 which may be welded to the bottom thereof. The backing plate 102 has secured at its lower extremity a marking bar 104. In the preferred embodiment illustrated in FIGS. 4 and 5, the marking bar 104 is conveniently of rectangular cross section, e.g., square steel beam mounted so that a corner 106 is disposed for engagement with the ground. The sloping backing plate 102 covers the open beveled end 108 of the skid bar 104 and provides a lift to enable the marking sled to ride up over obstructions which may be encountered, e.g., rocks. Side support plates 110 and 112 are conveniently welded to the axle 46 and to the opposite edges 114 and 116 of the bar 104 for added rigidity. In order to prevent axial movement of the axle 94, there is conveniently provided a support collar 118 welded to the axle 94 and coacting with a lower flange 120 on the sleeve 88 as best shown in FIG. 6.

Although the foregoing description has been primarily concerned with the structure of the right hand laterally extensible assembly 20 as shown in FIG. 1, for most purposes and for best results, there are two such assemblies provided, one each on the right hand side of the vehicle and one on the left hand side of the vehicle. When the device is in operation, the laterally extensible assemblies 20 are lowered by means of the cable 74 and the winches 82 to the position shown in FIG. 1. In response to movement of the vehicle, the pumps 74 distribute liquid through the hose 18 and the nozzles 72 carried on the support arm 22 to the ground or to a crop as the case may be. Simultaneously, the sled marker 104 is scribing a mark on the ground at the extremity of the spray coverage. Depending on the farmer's mode of making his passes across the field, either the right hand or the left hand sled 104 is placed within the groove marking the outer margin of the previous pass. With this ground mark as a guide, the operator of the vehicle is enabled to place the proper marker in the groove in the ground cut in the previous pass as a guide for making the next succeeding pass. In this manner, "skips" or overlaps are avoided thereby improving the quality and quantity of the yield. Should the apparatus encounter an obstruction in the process of traversing a groove or cutting a groove, the sloping backing plate 102 will enable the device to ride up over the obstruction. The hinge angle structure such as shown in FIG. 9 enables vertical movement of the arm 22 up and down in response not only to contour but also to obstructions. The principal portion of the weight of the laterally extending assembly is carried close to the body of the vehicle although there is sufficient weight at the outer extremity of the support arm 22 to enable adequate visible marking of the ground. FIG. 10 shows a wheel or disc type of swivel marker located at the outer end of the distribution arm. The wheel 104a replaces the sled marker when field conditions are such that a wheel-type marker is more effective to support the outer end of the distribution arm than a sled-type marker, e.g., when the ground is very wet. The wheel may be a disc or a pneumatic or solid rubber tired wheel capable of producing a visible rut or track in soft ground. To give some indication of the size of the equipment illustrated in FIG. 1, the total span with the two laterally extensible assemblies is approximately 45 feet. Spray coverage of the area between the support arms 22 is provided by a hose connection 122 having nozzles 124 thereon and disposed along the track marginal edge of the truck bed 12.

When the device is not in use, the laterally extensible assemblies 20 are folded back against the sides of the vehicle by operation of the winches 82 and the cables 74 to assume a position such as shown in FIG. 3.

What is claimed is:

1. Agricultural apparatus for use with a vehicle for delivering a material, such as a fertilizer or pesticide, along two parallel spaced field paths, one at each side of the vehicle and along another parallel central path therebetween, and for marking the outer edges of the entire path on the field so that upon the next pass of the vehicle across the field a like entire path may be supplied with the material without substantial voids or overlaps of delivered material, comprising:
   a. a pair of boom support members, each being rigidly affixable to an opposite side of the vehicle and between its ends,
   b. each boom support member being mounted for major pivotal movement about a first axis lying in a substantially vertical plane adjacnet one side of the vehicle and disposed at a forwardly and upwardly median acute angle of the order of 40° to 60° relative to the forward direction of the vehicle,
   c. a boom supported by each of the boom support members with means securing the inner or proximate end of each boom to its support member for minor limited pivotal movement about a second axis substantially normal to said first axis,
   d. a field marker carried by the outer end of each boom constantly supporting each end against downward gravitational movement and as limited by the depth of a continuous furrow formed thereby in the soil,
   e. each marker being so constructed to engage an obstacle in the soil, such as a rock or the like, and pass over same, swinging the boom about said first axis in a rearward and upward direction about said first axis, the boom swinging forwardly and downwardly to its normal operative position after the marker has passed over the obstacle, said second axis permitting minor swinging of the boom thereabout independent of movement thereof about said first axis,
   f. each marker being caster mounted to the end of its boom for free rotation about a substantially vertical axis and disposed rearwardly of its caster axis to permit it to pivotally trail the boom and follow a curved path equidistant from a curved path of the vehicle,
   g. fixed material distributing means rigidly affixable to the rear end of the vehicle substantially parallel to the booms and of a length substantially that of the distance between the inner ends of the booms for distributing the material to said central path,
   h. said first axes permitting the booms to be swung to transport positions substantially normal to their operative positions in which they are disposed at upwardly and rearwardly angles of said 40° to 60°.

2. Apparatus in accordance with claim 1 including an elongated stabilizer brace pivotally connected at its inner end to each of said support members at a locus above the pivotal connection of the boom thereto and pivotally connected at its outer end to the boom at a locus between its ends, said brace being resiliently extensible and contractible to stabilize the boom and absorb abnormal forces which would tend to rupture a rigid like but non-extensible brace.

* * * * *